Feb. 4, 1958    L. G. DANIELS    2,822,000
MULTIPLE PORT VALVE ARRANGED FOR MULTIPLE RINSE RATES
Filed July 26, 1954    5 Sheets-Sheet 1
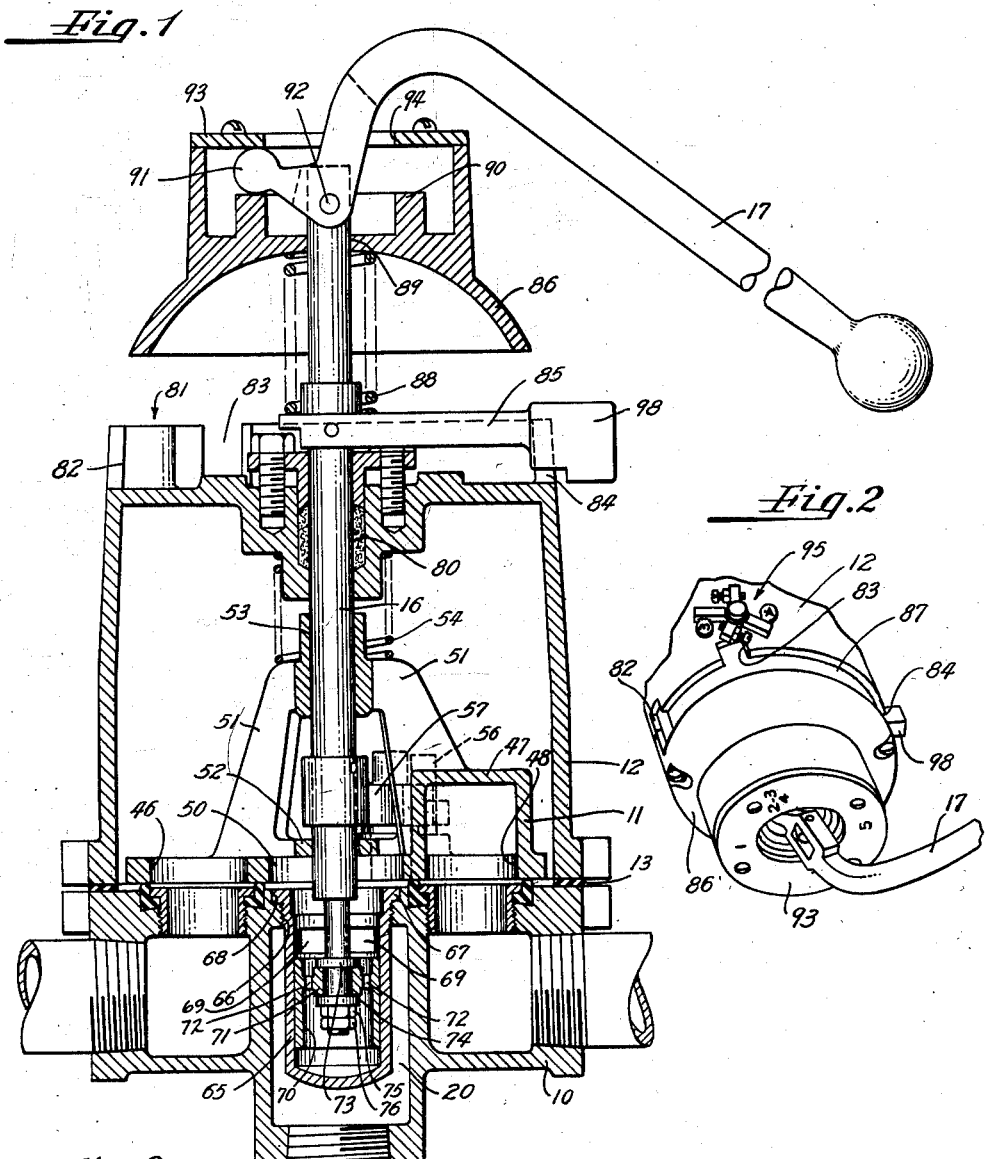
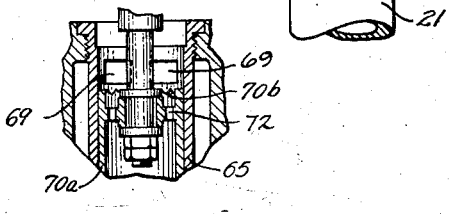
Inventor
Lee G. Daniels
By McCanna and Morsbach
Attys.

Feb. 4, 1958 L. G. DANIELS 2,822,000
MULTIPLE PORT VALVE ARRANGED FOR MULTIPLE RINSE RATES
Filed July 26, 1954 5 Sheets-Sheet 2
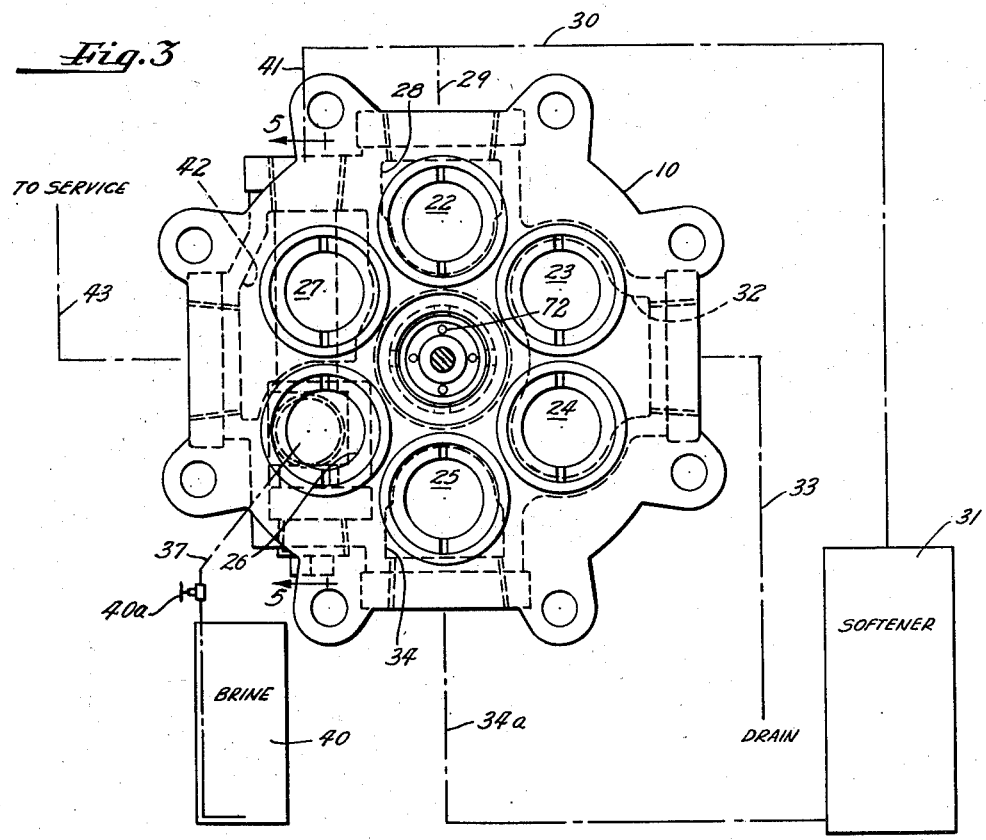
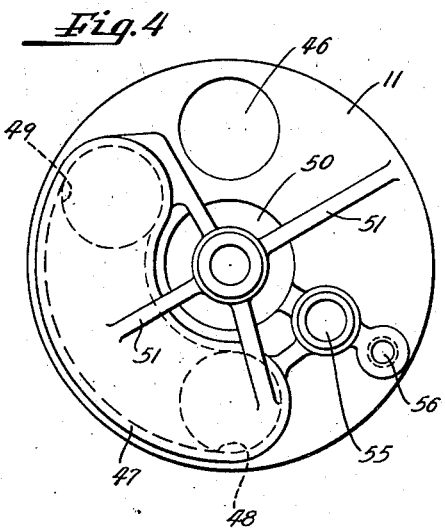
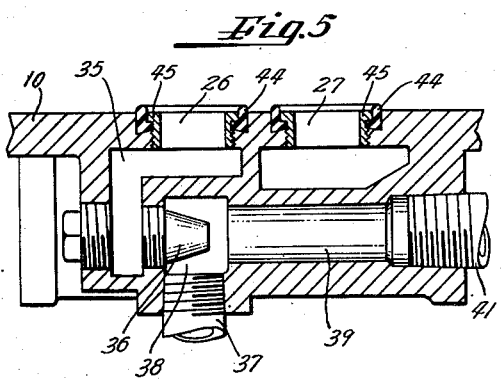
Inventor
Lee G. Daniels
By McCanna and Morsback
Attys.

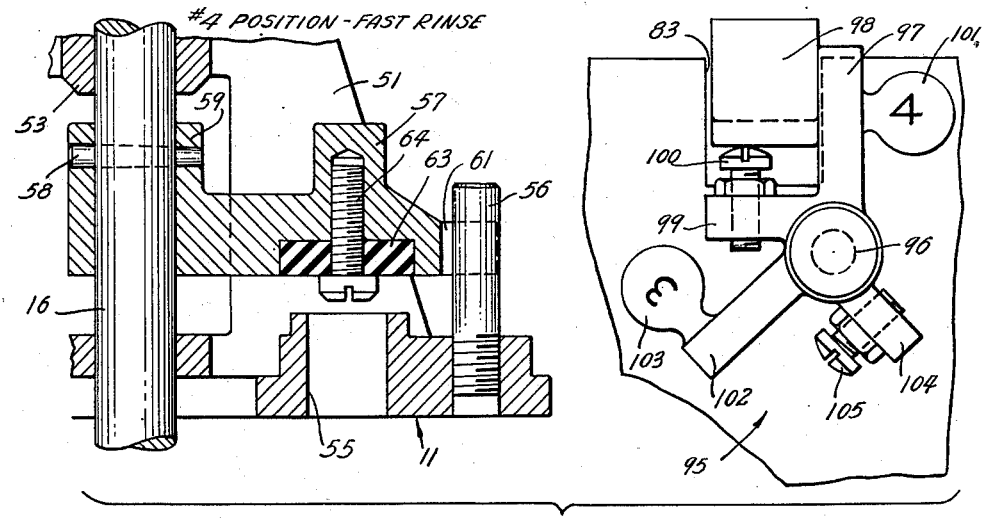
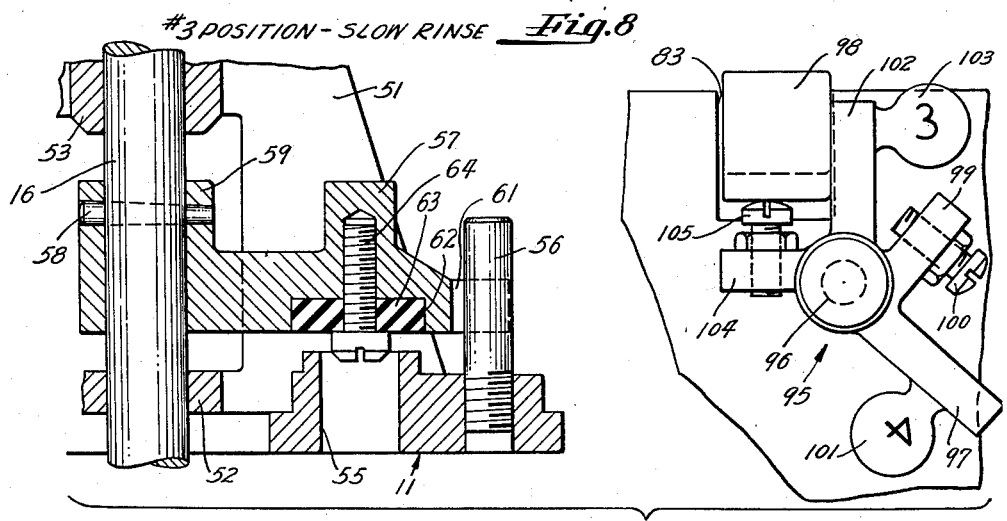
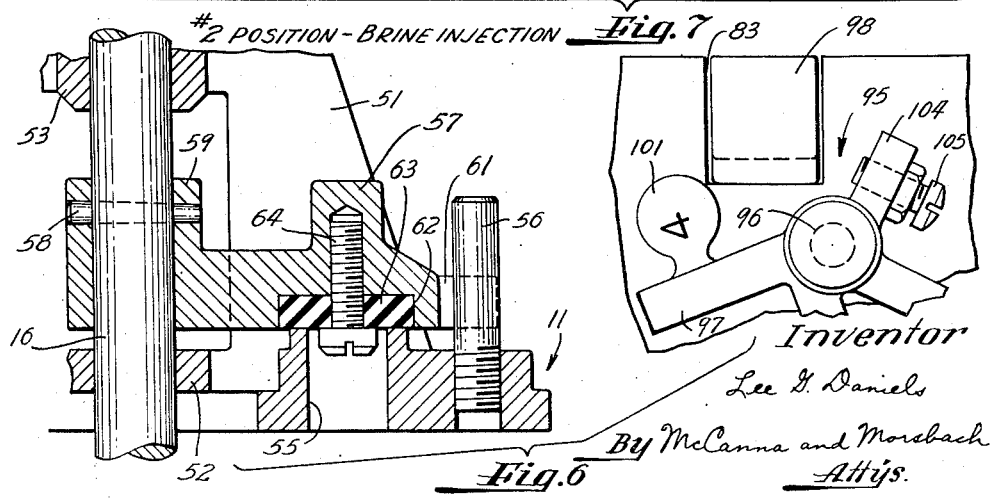

Feb. 4, 1958  L. G. DANIELS  2,822,000
MULTIPLE PORT VALVE ARRANGED FOR MULTIPLE RINSE RATES
Filed July 26, 1954  5 Sheets-Sheet 4

Inventor
Lee G. Daniels
By McCanna and Morsbach
Attys.

Feb. 4, 1958  L. G. DANIELS  2,822,000
MULTIPLE PORT VALVE ARRANGED FOR MULTIPLE RINSE RATES
Filed July 26, 1954  5 Sheets-Sheet 5

Inventor
Lee G. Daniels
By McCanna and Morsbach
Attys.

United States Patent Office 2,822,000
Patented Feb. 4, 1958

2,822,000

MULTIPLE PORT VALVE ARRANGED FOR MULTIPLE RINSE RATES

Lee G. Daniels, Rockford, Ill.

Application July 26, 1954, Serial No. 445,648

24 Claims. (Cl. 137—630.15)

This invention relates to valves of the multiple port, lift-turn type.

In valves of the type in which a multiple port stem plate or rotor is mounted to be unseated, turned and reseated in confronting relation with a valve body or stator to position preselected ones of the stem plate ports in registration with valve body ports for selectively controlling the flows through the valve, difficulty is frequently encountered in unseating and reseating the stem plate due to action of the fluid pressure tending to resist unseating and assist reseating making the plate difficult to unseat and causing water hammer in reseating. In some valve designs an inlet valve member has been secured to the stem for cutting off the flow of incoming liquid under pressure as the plate is unseated but these designs have largely failed in the purpose because of the pressure differential operative on the inlet valve.

Accordingly, it is an object of the present invention to provide a multiple port, lift-turn valve of novel construction enabling the maintaining of fluid pressure balance on opposite sides of the inlet valve at the pressure inlet of the lift-turn valve.

A further object is to provide a multiple port lift-turn valve wherein the lifting and seating of the valve is preceded by preliminary opening of an auxiliary valve on the plate to equalize in large measure differences in water pressure against opposite sides of the plate.

Another object of the invention is the provision in a valve of the character described of a balanced inlet valve arranged to close before the stem plate is lifted and another valve on the stem plate arranged to open before the stem plate is lifted to relieve the pressure in the valve bonnet, thus reducing to a minimum the difficulty in lifting and reseating the stem plate and reducing water hammer.

In the use of the more recent base exchange materials in water softeners, it has been discovered that the effectiveness of these exchange materials is improved by leaving the brine regenerant in contact with the exchange material for a longer period of time during the regeneration of the exchange material. To this end, it is desirable to have a slow rinse step in the regeneration of the exchange material immediately following the reagent injection step, the reagent being washed down slowly through the exchange material in the water softener tank during the slow rinse step. Following the slow rinse step, a fast rinse step is desirable for rinsing out the tank. For carrying out these rinse steps, the present invention incorporates a novel organization of elements enabling both rinse steps to be carried out with a single angular setting of the stem plate.

Therefore, it is another object of my invention to provide a novel lift-turn valve construction having an adjustable mechanism by means of which both a slow rinse and a fast rinse flow may be established through the valve at a single angular setting of the stem plate of the valve.

A further object of this invention is to provide a lift-turn valve adapted for use with a water treatment apparatus and in which brine injection, slow rinse and fast rinse flow are established through the valve at a single angular location of the stem plate of the valve, without the necessity of lifting and turning the stem plate to different angular locations in order to establish these different flows.

The last-mentioned objects are preferably accomplished in accordance with the present invention by the provision in a lift-turn valve of a lost-motion connection between the stem and the stem plate of the valve which permits the stem plate to seat in confronting relation with the valve body while the stem is not fully seated, an auxiliary valve member attached to the stem and positioned to control the flow through an auxiliary valve passage in the stem plate, and an adjustable stop cooperable with the stem to control the retraction of the stem and thereby to control the position of the auxiliary valve member for selectively blocking the auxiliary valve passage or uncovering this passage partially or fully to permit either restricted or unrestricted flow therethrough, as desired.

Other and further objects and advantages of the present invention will be apparent from the following description of a preferred embodiment thereof.

In the drawings:

Figure 1 is a longitudinal section through a multiple port, lift-turn valve constructed in accordance with the principles of the present invention;

Figure 2 is a fragmentary perspective view of the upper end of the Figure 1 valve;

Figure 3 is a top view of the valve body portion of the Figure 1 valve, showing the ports and passages in this valve body and showing schematically the connections of these ports and passages to the various parts of the water treatment system with which the valve is associated;

Figure 4 is a top view of the stem plate or rotor of the Figure 1 valve, showing its ports and passages which cooperate with the ports and passages in the Fig. 3 valve body for controlling the various flows through the valve;

Figure 5 is a section through the valve body, taken along the line 5—5 in Fig. 3 and showing the injector in the valve body;

Figure 6 illustrates the position of the stem plate and adjustable stop during the reagent injection step;

Figure 7 is a view similar to Fig. 6 and showing the respective positions of the parts during the slow rinse step;

Figure 8 is a view similar to Figs. 6 and 7 and showing the respective positions of the parts during the fast rinse step;

Figure 9 is a fragmentary section through a modified form of the inlet valve at the pressure inlet of the lift-turn valve of the present invention;

Figure 10:
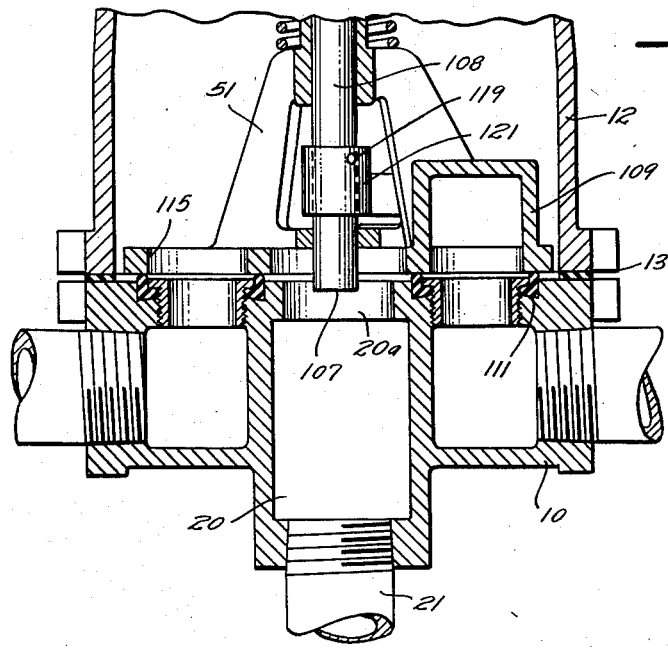
Figure 10 is a fragmentary section somewhat similar to Figure 1 showing a modified structure.
Figure 12:
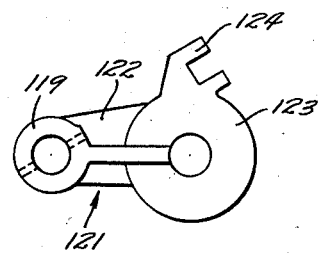
Figure 12 is a top view showing the auxiliary valve of the modified structure.
Figure 11:
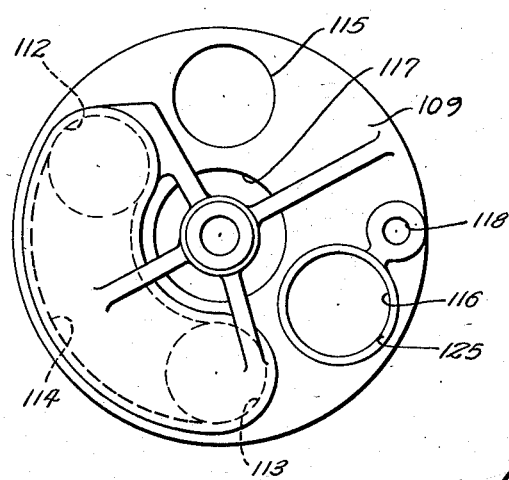
Figure 11 is a view similar to Figure 4 showing the modified structure.

Referring first to the embodiment shown in Figures 1 through 9, the cast body of the valve, indicated by the numeral 10, has a plurality of ports and passages therein for cooperation with ports and passages in a rotary stem plate or multiple port rotor 11 for controlling communication in a water treatment system which has pipes connected with the valve body in communication with the passages thereof. The body or multiple port stator 10 of the valve constitutes the stator, while the stem plate 11 is the rotor. The stem plate 11 is enclosed by a cover or bonnet 12 fastened above the body 10 and separated therefrom by a gasket ring 13 of suitable resilient material, such as rubber. The gasket 13 is compressed between the respective adjacent parts to prevent leakage thereat. A valve stem 16 having a connection to the stem plate 11 extends through the valve cover member 12 and at its outer end is connected to a lever 17, by means of which the stem plate 11 may be lifted and turned to suitable operative positions seated on the body 10, as will appear hereinafter.

The body or stator 10 of the valve is formed with a centrally located inlet chamber 20 which receives raw water from the supply pipe 21. A plurality of evenly spaced ports 22—27 (Fig. 3) formed in the inner face of the body 10 are arranged angularly about the central inlet chamber 20 and are spaced at equal radial distances therefrom. The top port 22 communicates with a first passage 28 in the valve body which leads to a branch conduit 29 leading to the pipe 30 which extends to the top of the treatment tank 31. Each of the drain ports 23 and 24 communicates with a chamber 32 in the valve body leading to the drain pipe 33. The bottom port 25 communicates with a valve body passage 34 leading to a pipe 34a connected to the bottom of the treatment tank. The port 26 in the inner face of the valve body 10 communicates with a passage 35 in the valve body (Fig. 5) leading to the inlet of an injector nozzle 36. A reagent feed line pipe 37 communicates with a chamber 38 in the valve body 10 at the discharge side of the nozzle 36 and with the throat 39 of the injector, so that water discharged through the nozzle 36 causes reagent to be drawn from the reagent tank 40 through pipe 37 and thence through the throat 39 of the injector. The outlet pipe 41 from the injector leads to the pipe 30 connected to the top of treatment tank 31. The service port 27 in the inner face of the valve body or multiple port stator 10 communicates with a passage 42 leading to the service pipe 43 through which treated water is passed to service. Suitable resilient compressible annular gaskets 44 (Fig. 5) are mounted by means of the threaded shouldered ferrules 45 at the body ports 22—27 to extend beyond the inner face of the valve body 10, to seal the ports and to space the plate from the face of the body when the plate is seated.

The stem plate or multiple port rotor 11 of the valve (Fig. 4) is formed with a passage or port 46 positioned to register selectively with certain of the annularly arranged ports in the inner face of the valve body 10. The stem plate also has a transfer passage 47 extending between ports 48 and 49, which are located at the same radial distance from the axis of the stem plate as the first-mentioned port 46 and which are spaced apart 120 degrees from each other. These transfer passage ports are also adapted to register selectively with preselected ones of the body ports 22—27 when the stem plate 11 is seated on the body 10. The stem plate also has a central axial opening 50 positioned above the central inlet chamber 20 in the body. A plurality of spaced ribs 51 extend upwardly from the stem plate, these ribs at their lower ends being connected to a central collar 52 (Fig. 1) shaped to snugly surround the valve stem 16 above the central inlet opening 50 in the stem plate and form a lower plate bearing. At their upper ends these ribs are connected to an upper collar 53, which also snugly surrounds the stem 16 to provide an upper plate bearing. A compression coil spring 54 acts between the cover member and the upper ends of the ribs 51 to urge the stem plate into its seated position at the inner face of the body 10. The stem plate is also formed with an auxiliary valve passage or port 55 and carries an upstanding post 56 adjacent this passage, for a purpose which will appear hereinafter.

Inlet valve

One aspect of the present invention is concerned with a novel balanced-pressure inlet valve at the inlet chamber 20 in the valve body 10. This inlet valve includes a tubular cylindrical casing member or housing 65 (Fig. 1) which is closed at its lower end and which at its upper end is threadedly received in an inlet opening 66 in the valve body 10 at the top of the valve body inlet chamber 20. A flange 67 at this end of the casing member 65 is received in a complementary annular recess 68 in the inner face of the valve body 10. A plurality of ports 69 are formed in the casing member 65 at the upper end of the inlet chamber 20 in the valve body 10. Within the cylinder member 65 there is disposed a valve member or sleeve or tube 70 shaped to slide along the inside of the cylinder member 65. A central hub 71 of this valve sleeve is connected to the outer sleeve 70 by a web having a plurality of passages 72 effecting communication between opposite sides of the connecting web and between the upper and lower portions of the chamber within the cylinder member 65. An enlarged collar 73 on the stem 16 abuts against the upper end of the valve hub 71. A separable annular washer 74 is held, by means of adjustable nuts 75, 76 threaded onto the lower end of the stem 16, abutting against the lower end of the valve hub 71. By means of this arrangement, the valve sleeve 70 is connected to move in unison with the stem 16.

In the operation of this inlet valve, when the stem plate 11 is in its normal seated position and the stem 16 is in its seated position (Fig. 1), the valve sleeve 70 is positioned to uncover the ports 69 so that inlet water from the inlet chamber 20 flows through these ports upwardly through the central inlet port 50 in the stem plate. The passages 72 in the sleeve valve permit a portion of this water to flow into the lower portion of the cylinder casing member 65 of the inlet valve, so that there is a fluid pressure balance above and below the valve sleeve 70.

When the valve is manipulated to lift the stem plate 11 away from the valve body 10, there is maintained at all times a fluid pressure balance above and below the valve sleeve 70, as pointed out in detail hereinafter.

In Fig. 9 there is shown a modification of the inlet valve. In this form, the end of the valve sleeve 70a is formed with teeth-like projections 70b which cause a progressive change in flow through the ports 69 to minimize water hammer as the inlet valve is opened or closed. In other respects, the inlet valve of Fig. 9 is identical with that shown in Fig. 1.

Auxiliary valve

Another aspect of the present invention is concerned with the provision of a multi-function auxiliary valve member 57 (Figs. 1 and 6–8) keyed at 58 to the stem 16 to move in unison therewith. This member 57 functions in a lost-motion connection between the stem 16 and the stem plate 11 when the lever 17 is manipulated to lift or lower the stem and the stem plate. Also, member 57 serves as a linkage between the stem 16 and the stem plate 11 for turning the stem plate in response to turning of the lever 17. And finally, member 57 acts as a valve for controlling the flow through the passage 55 in the stem plate to the top of the treatment tank 31.

In providing a lost-motion connection between the stem 16 and the stem plate 11, when the stem 16 is lifted in a direction away from the valve body 10 the member 57 is lifted in unison with the stem and the stem 16 slides through the rotor bearings 52 and 53 until the upper face of the hub portion 59 of member 57 engages the lower end of the upper collar 53 of the stem plate assembly. After this engagement, the stem plate 11 is lifted in unison with the stem. Normally, when the stem plate 11 is seated and when the stem 16 is in its seated position, the hub 59 of member 57 is spaced below the upper collar 53 of the stem plate assembly, so that a substantial initial axial movement of the stem 16 occurs before the stem plate 11 is lifted away from the adjacent inner face of the valve body 10.

To provide a connection between the stem 16 and the stem plate 11 for turning the stem plate in unison with the stem, the member 57 has an outwardly extending arm which is bifurcated at its outer end at 61 to engage opposite sides of the upstanding post 56 attached to the stem plate. This arrangement insures that the stem plate is turned with the stem, while at the same time permitting the member 57 to have a lost-motion movement axially relative to the stem plate.

Adjacent its outer end, the member 57 is formed with a flat circular recess 62 at its face toward the stem plate. A resilient gasket 63 is seated in this recess and is attached to the member 57 by means of a threaded bolt 64. This disk is adapted to seat against the upper face of the stem plate 11 at the passage 55 therein when the stem 16 is in its seated position as urged by the spring 88.

*Indexing arrangement for the lift-turn valve*

The upper end of the stem 16 of the lift-turn valve extends up through a suitable stuffing box 80 bolted onto the upper face of the bonnet or cover 12. At this upper face the cover member 12 is formed with an upstanding annular index flange 81 which is recessed at three spaced portions 82, 83 and 84 to define three angularly spaced index slots or locations to which the lever 17 may be adjusted. Attached to the stem 16 is a radially outwardly extending index arm 85, which extends in the same direction outward from the stem as does the lever 17. When the lever 17 is manipulated to lift and turn the stem 16, the lever may be selectively turned to any desired one of the angular locations to position the index arm 85 in register with one of the index slots or recesses 82, 83 or 84 (see Fig. 2). Then when the lever 17 is manipulated to reseat the stem 16 the index arm 85 drops into the particular index recess to which it has been turned, whereby to lock the stem 16 against turning at this angular position.

A generally dome-shaped cap 86 is bolted to the bonnet or cover 12 and is formed with an elongated slot 87 (Fig. 2) at its lower end which extends somewhat more than 180 degrees around the top of the index flange 81 and in which the index arm 85 operates between the described spaced index recesses in the flange. A compression coil spring 88 acts between the cap 86 and the index arm 85 to normally urge the stem 16 to its seated position. The cap 86 is formed with a central bearing 89 through which the upper end of stem 16 projects. Above this bearing, an annular upstanding shoulder at its top face provides a bearing surface 90 which the toe projection 91 attached to lever 17 is adapted to engage, whereby the lever 17 may be pivoted about its toe and the stem rotated with the toe riding along the surface 90. A pivotal cross pin connection 92 between lever 17 and stem 16 enables pivotal movement of lever 17 about its toe 91 to effect axial movement of the stem 16 for moving the stem plate 11 toward or away from the adjacent inner face of the valve body 10, depending upon the direction of pivotal movement of the lever 17. A flat annular end plate 93 attached to the top of the end cap 86 has a central hole 94 through which the lever 17 extends and which freely permits the described pivotal movement of the lever 17 to take place.

*Adjustable stop member for controlling auxiliary valve*

Another aspect of the present invention is concerned with a novel adjustable and movable stop member located at the index recess 83 in the annular index flange 81 and adapted to coact with the index arm 85 for selectively determining whether the stem 16 (and the auxiliary valve member 57) may be fully seated or only partially seated. By virtue of this novel arrangement, as described in detail hereinafter, the assembly of stem 16, stem plate 11 and lever 17 occupies the single angular location at the index recess 83 during the reagent injection step and also during fast and slow rinse steps.

This movable stop member, indicated generally at 95 in Figs. 2, 6, 7 and 8, is pivoted at 96 to the cover adjacent the index recess 83 and is adapted to occupy the position shown in Fig. 6 or either of the two positions shown in Figs. 7 and 8 in which the auxiliary valve member 57 is retained in either of two open positions. When the stop member occupies the position shown in Fig. 6, the stem is free to move to its seated position with the gasket 63 closing the auxiliary valve port 55 as shown.

The stop member has a first right-angled portion including an arm 102 which is adapted in one angular position of the movable stop member 95 (Fig. 7) to extend at one side of the index recess 83 immediately adjacent thereto and to bear against one side of the enlarged depending head 98 on the index arm 85 which seats in the index recess 83. A number plate 103 is attached to the arm 102 and is provided for the purpose of indicating the angular position to which the stop member 95 is adjusted. The other arm 104 of this first right-angled portion of the stop member 95 supports a stop bolt 105, which is adjustably threadedly mounted in the arm 104 to have its head extend a preselected distance above the arm for limiting the extent to which the enlarged head 98 can seat in the recess 83. By turning the threaded stop bolt 105 it may be adjusted to produce a desired spacing of the valve member 57 and gasket 63 away from the port 55 when the stop member is adjusted to the angular position shown in Fig. 7 and the rotor is seated.

The stop member 95 also has a second right-angled portion which includes an arm 97 adapted in another angular position of the stop member 95 (Fig. 8) to extend along the side of the index recess 83 and bear against one side of the head 98, a number plate 101 being attached to this arm to indicate this angular position of the stop member 95. The other arm 99 of this second right-angled portion of stop member 95 supports a stop bolt 100, which is threadedly mounted in the arm 99 and which is adjustable relative thereto to have its head extend a preselected distance above the bottom of index recess 83 to space the auxiliary valve member 57 a preselected distance above the auxiliary valve port 55 in this angular position of the stop member 95, the rotor being held in seated position by action of the spring 54.

*Operation*

In the use of the above-described lift-turn multiport valve with the water treatment system of Fig. 3, during service the lever 17 is positioned to place the index arm 85 in the index recess 84. The stem plate 11 is in its fully seated position to compress the gaskets or sealing rings 44 at the annularly spaced ports 22—27 in the inner face of the valve body 10. In this angular position of the stem plate 11, the stem plate port 46 registers with the valve body port 22, the stem plate port 49 registers with the valve body port 27, the stem plate port 48 registers with the valve body port 25, and the valve disk 63 carried by the valve member 57 attached to stem 16 closes the auxiliary valve port 55, which leads through the body port 24 and chamber 32 to the drain line 33. Raw water enters the lift-turn valve through the inlet pipe 21 and flows into the central inlet chamber 20 in the body 10 and through the apertures 69 in the cylindrical casing member 65 of the inlet valve and the central inlet passage 50 in the stem plate into the valve chamber above the stem plate. The raw water then flows through the stem plate port 46, valve body port 22, body chamber 28, and pipes 29 and 30 to the top of the treatment tank 31. After flowing downward through the tank 31 where it is treated, the water passes out the bottom of the tank through the pipe 34a to the valve body passage 34 and thence through body port 25, plate port 48, transfer passage 47, plate port 49, body port 27 and body passage 42 to the service line 43.

It will be noted that, with the stem plate 11 in its seated position, the water pressure above and below the inlet valve member 70 is equalized since a portion of the raw water passing through the apertures 69 in the casing member 65 of this inlet valve flows down through the holes 72 into the chamber below the valve 70.

When the water treating material in the treatment tank 31 requires regeneration, the regeneration cycle is initiated by shifting the lever 17 of the lift-turn valve to establish a backwash flow of water upward through the treatment tank 31. The lever 17 is manipulated to lift the stem plate 11 away from the valve body 10 and to turn it to the position at which the index arm 85 attached to stem 16 is adapted to seat in the index recess 82. In thus manipulating the lever 17, when it initially lifts the stem 16 the stem plate 11 remains seated against the gaskets on the valve body 10. The inlet valve 70 is initially moved in unison with the stem 16 and moves upward to shut off the flow of raw water through the ports 69 in the cylindrical member 65. When this movement is begun, the water pressure above and below or in other words at opposite ends of the inlet valve 70 is equalized, as described before, so that the raw water line pressure does not oppose the lifting of the valve stem 16. The lifting of the stem 16 also lifts the auxiliary valve member 57 attached thereto and the gasket 63, which had been closing the auxiliary valve port 55 leading to drain line 33, is lifted away from this port so as to pass to drain the water in the valve. Thus, during the lifting of the valve stem 16 the water pressure above and below the inlet valve 70 is equalized, since both below the inlet valve 70 in the casing member 65 and above the inlet valve in the valve chamber above the stem plate 11 the water pressure is reduced approximately to zero. Further lifting of the stem 16 causes the hub 59 of the member 57 to engage the upper stem plate collar 53, to lift the plate 11 in unison with the stem 16. The plate is then turned in unison with lever 17 by means of the connection at 61, 56 between the member 57 and the plate.

After having turned to position the index arm 85 in register with the index recess 82, the lever 17 is lowered to seat the stem and permit spring 54 to seat the stem plate 11 against the valve body 10 at this angular position. As previously mentioned, because of the equalization of pressures at opposite sides of the inlet valve 70, and on opposite sides of the stem plate, there is no initial pressure unbalance tending to oppose this seating of the stem and stem plate. And as soon as the valve stem 16 has been moved toward reseated position sufficiently to uncover the ports 69 at the casing member 65, the raw water line pressure is established above and below the inlet valve 70 to continue the pressure balance above and below the inlet valve 70.

When the stem plate 11 is fully seated against the valve body 10 the spring 88 holds the stem 16 in its seated position and raw water from the inlet chamber 20 in the valve body flows through the central inlet passage 50 in the stem plate and thence through the plate port 46, the valve body port 25, valve body passage 34 and pipe 34a to the bottom of the treatment tank 31. The water flows up through the treatment tank and flows out through the pipe 30 leading from the top of the treatment tank. From here, the water passes through pipe 29, valve body passage 28, valve body port 22, plate port 48, transfer passage 47, plate port 49, body port 24 and body passage 32 to the drain line 33.

At the completion of the backwash step, the lever 17 is manipulated to lift and turn the stem plate 11 to a position at which the index arm 85 is seated in the index recess 83. In so lifting and turning the stem plate, the pressure balance above and below the inlet valve 70 is again maintained. As soon as the flow of incoming water is terminated at the inlet openings 69 the pressure within the bonnet drops to atmospheric since the top of the treatment tank is connected to drain through transfer passage 47.

When the index arm 85 is first seated in the index recess 83, the stop member 95 is positioned in the position shown in Fig. 6 to permit the index arm 85 and the stem to assume their fully seated positions. This establishes the reagent injection flow to the treatment tank 31 as follows: Raw water from the valve body inlet chamber 20 passes through the central inlet passage 50 in the plate and through the plate port 46 to the body port 26, from which it passes through the passage 35 and the injector nozzle 36 (Fig. 5). The flow of water through the nozzle draws reagent from the tank 40, when a valve 40a has been opened, through the reagent feed pipe 37 and thence through the throat 39 of the injector. The water and reagent then flows through pipes 41 and 30 to the top of the treatment tank 31. After flowing downwardly through the treatment tank to regenerate the exchange material therein the fluid flows out the bottom of the tank through the pipe 34a, through body passage 34, body port 25, plate port 49, transfer passage 47, plate port or passage 48, and thence through the body port 23 and body passage 32 to the drain line 33. In this fully seated position of the stem, the auxilitry valve disk 63 carried by the member 57 closes the auxiliary valve port 55, which registers with the body port 22.

After a predetermined amount of reagent from the tank 40 has been injected into the treatment tank, the flow of reagent is shut off at valve 40a. The next step in the regeneration cycle is to rinse the bed of exchange material in the treatment tank 31. With the more recent types of base exchange materials it has been found that their effect is augmented by leaving the reagent in contact with the exchange material for a longer period of time. To this end, the lift-turn valve of the present invention has provision for a slow rinse during which the water rinses down slowly through tank 31 and permits the reagent to remain in contact with the exchange material in the treatment tank 31 longer, followed by a fast rinse during which the water flows at a higher velocity to rinse the reagent from the treatment tank.

To establish the slow rinse, the lever 17 is manipulated to lift the index arm 85 out of the index recess 83, and thereafter turning the index arm a short distance sufficient to allow the member 95 to clear. Adjustable stop member 95 at the index recess 83 is then turned to the position shown in Fig. 7, to position its stop bolt 105 beneath the head 98. The lever 17 is then returned to partially reseat the index arm 85 in the index recess 83, to the extent permitted by the stop bolt 105, the arm 102 bearing against the side of the head to prevent turning of the stop. The parts are suitably proportioned and adjusted so that when the index arm 85 is thus only partially reseated the auxiliary valve member 57 is spaced slightly away from the auxiliary valve port 55, as shown in Fig. 7, and a limited flow of water is established through the port 55 and the registering body port 22 and body passage 28 through pipes 29 and 30 to the top of the treatment tank. At the same time, there is an additional flow of water through the plate port 46, valve body port 26, valve body passage 35, injector nozzle 36, throat 39 and pipes 41 and 30 to the top of the treatment tank, as during the reagent injection step. This latter flow is restricted by the nozzle 36 to a predetermined volume rate. Thus, either the more restricted flow through the nozzle or the combined flows of water may be supplied to the top of the treatment tank to selectively establish either of two slow rinse rates down through the treatment tank. The effluent from the treatment tank during the slow rinse step is passed to the drain line 33 as in the reagent injection step.

When it is desired to terminate the slow rinse and begin the fast rinse, the lever 17 is manipulated to again lift the index arm 85 out of the index recess 83, the adjustable stop member 95 is then turned to the position shown in Fig. 8 to swing the stop bolt 100 under the head 98 and the index arm 85 is reseated in the index recess 83 to the limited extent permitted by the stop bolt 100. This positions the auxiliary valve member 57 carried by the valve stem 16 an even greater distance above the plate 11, as shown in Fig. 8, to completely uncover the auxiliary valve port 55 and permit increased flow of water therethrouguh. The flow of water through the plate passage 55, body port 22 and body passage 28, added to the described limited water flow through plate passage 26, body passage 35 and injector 36, 39, establishes a fast rinse down through the treatment tank 31, the effluent being passed from the bottom of the treatment tank to the drain line 33, as before.

Following the completion of the fast rinse, the lever 17 may be manipulated to lift and turn the stem plate back to its service position for establishing a flow of untreated water through the lift-turn valve to the top of the treatment tank 31 and for passing the treated water from the bottom of the treatment tank through the lift-turn valve to the service line 43.

The embodiment of the invention shown in Figs. 10 through 14 differs from that of the previous form primarily in three aspects, namely, the omission of the inlet valve, the omission of the structure providing the step shown in Fig. 7, and a change in the size of the port 55 shown in Fig. 4.

Fig. 10 shows the lower portion of the valve structure of Figure 1 modified by the omission of the cylindrical housing 65, the valve sleeve 70, the collar 73, the hub 71, the washer 74 and the nuts 75 and 76. Thus, this structure has in common with the structure of Figure 1 the body 10, bonnet 12 and gasket 13. The structure also has a slidable valve stem 108 identical with the stem 16 of Figure 1 except for the elimination of the lower end thereof carrying the inlet valve, the stem 108 terminating at the point 107. In common with the form shown in Figure 1 the body has an inlet chamber 20 receiving raw water from a supply pipe 21, a body port 20a in the face of the body, and has the port and chamber construction shown in Fig. 3. A stem plate 109 is arranged to seat against the face of the body in sealing relation against the resilient gaskets indicated at 111 in Fig. 10.

The mutiple port rotor or plate 109 is very similar to the plate 11 and is provided with ports 112 and 113 and an interconnecting transfer passage 114. The plate also has a through port 115 as in the form of Fig. 4. An auxiliary valve port 116 passes through the plate 111 and is located on the same radius as the balance of the plate ports. An axial opening 117 forms an inlet passage through the plate. In this embodiment it is important that the ports and passages of the plate, namely the ports 112, 113, 115 and 116, and the passages 117 and 114 have cross-sectional or flow areas, at least as large or greater than the port areas of the annular ports of the body, namely body ports 22 through 27. The central body inlet port 20a should also have greater port area than the annular body ports.

Affixed to the slidable stem 108 is an auxiliary valve member 121 (Figs. 12 and 13) having a collar 119 around the stem attached thereto by a pin. The valve member includes an arm 122 which in turn mounts a valve disk holder 123 analogous in function to the valve member 57. A fork or the like indicated at 124 rides a post 118 fixed to the multiple port rotor or plate to effect turning of the plate with the stem and permits relative approach and return movement as between the plate and the valve member. An upstanding flange 125 surrounds the auxiliary valve port 116 and cooperates with a resilient valve disk 126 on the valve disk holder 123 to seal the passage through the port in the seated position.

Figure 14:
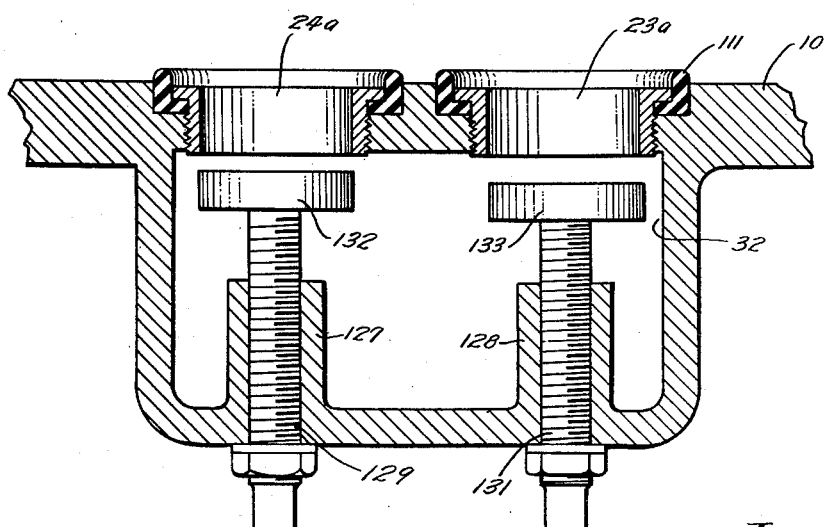
Figure 14 is a section through the drain ports of the body.

Fig. 14 is a fragmentary section through the body and through the drain ports of the modified structure showing the means for throttling or restricting the flow through drain ports 23a and 24a of the body. For this purpose the body has upstanding bosses 127 and 128, internally threaded to receive threaded stems 129 and 131. The outer ends of the stems are flattened for the reception of a wrench in turning the same and the inner ends carry disks 132 and 133 arranged coaxially with respect to the ports 23a and 24a. By adjusting the stems the rate of flow out through the ports 23a or 24a may be selectively controlled. If no adjustment of the flow through the ports is required, the flow may be restricted by reducing the size of the port opening, particularly port 23a.

In the form shown in Figs. 10 through 13, when the lever 17 occupies the service position with the index arm 85 in the index slot or recess 84 the plate 109 occupies its fully seated position against the sealing rings 44. In this position the plate passage 115 registers with body port 22, the plate port 112 registers with body port 27, the plate port 113 registers with body port 25, and the auxiliary valve member 123 closes the port 116 which in turn communicates with the body port 24a. It will be seen that in this position of the valve, when the service outlets from the service line are closed, the underside of the ports 113 and 112 and the transfer passage 114 is subjected to an upward pressure only slightly lower than the downward pressure on the plate. However, the pressure within the chamber 32 is atmospheric so that there is a substantial difference in pressure above and below the plate in the area of the ports 23 and 24.

When the lever 17 is manipulated to move the valve to the backwash position in which the index arm 85 rests within the recess 82, initial upward movement of the stem acts to move the auxiliary valve member 121 away from the port 116 so that raw water under substantially inlet pressure passes out through the port 24a prior to lifting of the plate. The restriction 132 limits the rate of flow through the port 24a and permits pressure to build up within the port 24a so as to reduce the effort required to lift the plate. This results from the fact that the port area of port 116 is substantially greater than the flow area through port 24a past the restriction 132. When the plate is subsequently moved free of the gaskets, water can of course flow directly from the inlet to the drain ports 23a and 24a. However, the presence of the restrictions 132 and 133 limit the rate of discharge so that the entire system may under proper conditions drop to a lower but a fairly uniform pressure as determined by the settings of the restrictions. When the stem is moved in reseating movement at the service position it will be seen that the plate first seats against the gaskets or sealing rings under a lower pressure differential and the auxiliary valve disk 123 thereafter exercises a throttling action as it moves on to closed position to reduce water hammer. The auxiliary valve member being of relatively small size can be more easily restrained in its seating movement by manual restraint on the handle 17.

The flows in the backwash position wherein the index arm rests in recess or slot 82 are the same in this modification as in that previously described. In the next position the index arm 85 rests in index recess 83 with the plate and auxiliary valve member fully seated, as described in connection with the previous embodiment. When the plate and stem are seated in this position raw water passes through the plate opening 115 into the body port 26 thence through the injector to draw brine and deliver the same through the pipes 41 and 30 to the top of the softener. Liquid flows from the bottom of the softener through pipe 34a, the body port 25 and plate port 112, passage 114 and plate port 113 and thence through the body drain port 23. In this fully seated position the valve member 121 closes the port 116.

As in the prior embodiment the reagent injection step is terminated by closing the reagent valve 40a to provide a slow rinse step wherein the flow through the softener tank is restricted to the water normally flowing through the injector.

Figure 13:
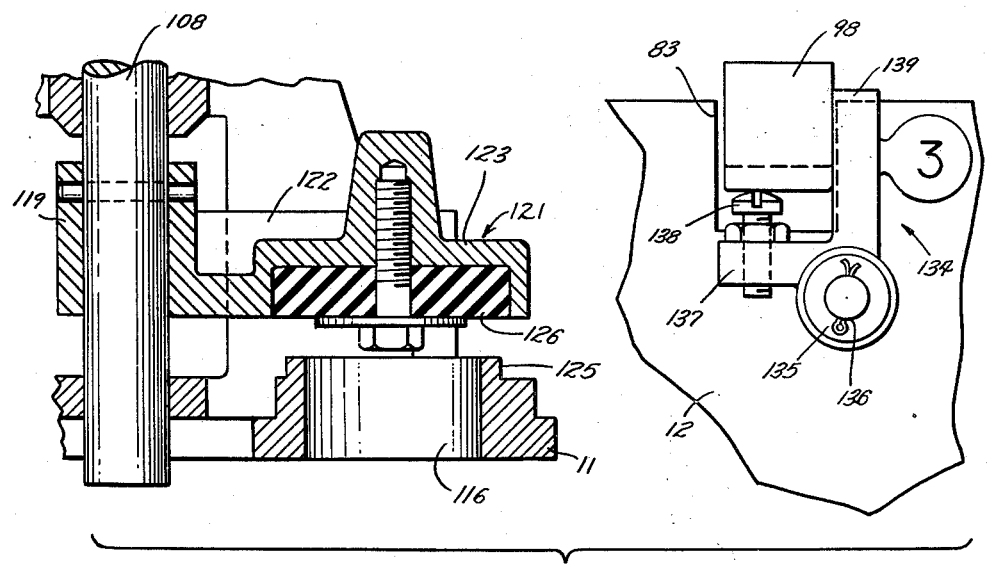
Figure 13 is a view of the modified structure similar to Fig. 8.

In the next position valve member 121 occupies the position shown in Fig. 13 and is moved thereto by raising the lever 17 to lift the index arm until the stop 134 can be swung into the position shown in Fig. 13 to retain the auxiliary valve member in this position. In this embodiment the movable stop is the same as that shown in the prior embodiment and the functioning is similar to that shown in Fig. 8 except that the stop arms identified by the numerals 97 and 99 in Fig. 8 are absent. The stop member 134 thus comprises a bearing 135 rotatably carried on a pin 136 secured to the bonnet, the bearing having an arm 137 carrying an adjustment screw 138 adapted to underlie the head 98. The arm 137 forms a bell crank lever with an arm 139 which rests against the side of the head 98 to retain the stop in position. As in the prior embodiment the stop acts to hold the auxiliary valve member 121 in elevated position and to permit raw water to flow through the auxiliary valve passage 116 and the body port 22 to provide a fast rinse for the base exchange material. At the end of the allotted time the lever 17 is manipulated to return the parts to the position shown in Figure 1 to complete the cycle of operation.

This is a continuation-in-part of my copending application Serial No. 299,717, filed July 18, 1952, now abandoned.

While in the foregoing specification and the accompanying drawings there has been disclosed specific embodiments of the present invention, it is to be understood that various modifications, omissions and refinements which depart from the described embodiment of the invention may be adopted without departing from the spirit and scope of the invention.

I claim:

1. A lift-turn valve, comprising a multiple port stator having an inlet opening, a multiple port rotor adapted to be positioned in confronting relation with said stator to position certain of its ports in registration with stator ports and adapted to be lifted, turned and reseated in confronting relation with the stator to differently position its ports in registration with stator ports for selectively controlling the flow through the valve, a stem for lifting and turning the rotor, an inlet valve connected to said stem and positioned at said inlet opening in the stator to control the flow therethrough into the stator in response to the position of the stem, and passages at said inlet valve effecting communication between opposite sides of the connection of the inlet valve to the stem for balancing the fluid pressure on the inlet valve at opposite sides of the connection of the inlet valve to the stem in all positions of the stem.

2. A lift-turn valve, comprising a multiple port stator having a central inlet opening, means defining a chamber at one side of said stator, a multiple port rotor in said chamber adapted to be seated in confronting relation with said stator and adapted to be unseated, turned and reseated in confronting relation with the stator for selectively controlling the flows through the valve, a stem for unseating and turning the rotor, an inlet valve housing at said central inlet opening in the stator having a plurality of passages controlling the communication between said central inlet opening and said valve chamber, an inlet valve in said inlet valve housing dividing said inlet valve housing into chamber disposed respectively on opposite sides of the inlet valve and reciprocable in said inlet valve housing for selectively closing or opening said passages therein to control the flow therethrough into said valve chamber, said inlet valve being connected to said stem to move in response to movement of the stem, and passages in said inlet valve effecting communication between said chambers in the inlet valve housing on opposite sides of the inlet valve for balancing the fluid pressure on said opposite sides of the inlet valve in all positions thereof.

3. The apparatus of claim 2, wherein said valve is formed with irregular upper edges to permit gradual closing and opening of said first-mentioned passages as the inlet valve is reciprocated.

4. A lift-turn valve, comprising a multiple port stator having a central inlet opening and a drain port, means defining a valve chamber at one side of said stator, a multiple port rotor in said valve chamber adapted to be positioned in confronting relation with said stator to position certain of its ports in registration with stator ports and adapted to be lifted, turned and reseated in confronting relation with the stator to differently position its ports in registration with the stator ports for selectively controlling the flows through the valve, a stem for lifting and turning the rotor, an inlet valve connected to said stem and positioned at said inlet opening in the stator to block the flow therethrough into the stator in response to lifting of the stem, said inlet valve at its upper end being in communication with said valve chamber, passages in said inlet valve effecting communication between opposite sides of the connection of the inlet valve to the stem for balancing the fluid pressures thereat on the inlet valve, a lost-motion connection between the stem and the rotor for lifting the rotor after preliminary lost-motion in response to lifting of the stem and means for establishing communication between the valve chamber and the stator drain port during said lost-motion movement of the stem for relieving the fluid pressure in said valve chamber through said drain port when said inlet valve is closed.

5. A lift-turn valve, comprising a multiple port valve stator, a multiple port rotor adapted to be seated in confronting relation with said stator and adapted to be unseated, turned and reseated in confronting relation with the stator to selectively control the flows through the valve, means for unseating, turning and reseating the rotor, said rotor having an auxiliary valve passage, an auxiliary valve positioned to control the flow through said passage in the rotor, and movable stop means operatively coacting with said auxiliary valve and movable selectively between different positions to define different positions of the auxiliary valve with respect to said auxiliary passage to control flow through said auxiliary passage.

6. A lift-turn valve, comprising a multiple port stator, a multiple port rotor adapted to be seated in confronting relation with said stator and adapted to be lifted, turned and reseated in confronting relation with said stator to selectively control the registraton of its ports with the stator ports and thereby to control the flows through the valve, a stem for lifting and turning the rotor, means pressing the rotor to its seated position in confronting relation with the stator, a lost-motion connection between the stem and the rotor permitting the rotor to seat in confronting relation with the stator while the stem is not fully seated, said rotor having an auxiliary valve passage, an auxiliary valve operatively connected to said stem to move in unison therewith and positioned at said auxiliary valve passage in the rotor to control the flow therethrough, and an adjustable stop operatively coacting with said stem to limit the movement of the stem toward the stator for selectively controlling the position of said auxiliary valve with respect to said passage in the rotor to control the flow through said passage.

7. In a lift-turn valve for controlling the service and regeneration of a base exchange water treatment apparatus having a treatment tank, the combination of a multiple port stator having a first passage adapted to communicate with the top of the treatment tank, a cover at one side of said stator enclosing a valve chamber, a multiple port rotor in said valve chamber adapted to be unseated, turned and reseated in confronting relation with said stator to selectively control the registration of its ports with the stator ports and thereby to control the flows through the valve, a stem for unseating and turning the rotor, means for resiliently urging the rotor to a position seated in confronting relation with the stator, a lost-motion connection between the stem and the rotor for delaying unseating of the rotor until the stem has been lifted a predetermined amount and permitting the rotor to seat in confronting relation with the stator before the stem is fully seated, said rotor having an auxiliary valve passage which communicates with said first passage in the stator in one angular position of the rotor, an auxiliary valve connected to said stem to move in unison therewith and located at said auxiliary passage in the rotor to control the flow therethrough, an index arm connected to said stem and operative to be indexed to various angular locations locations about the valve cover when the stem is turned, and an adjustable stop member mounted on said valve cover to engage said index arm in the angular position of the stem at which said auxiliary passage in the rotor registers with said first passage in the stator, said adjustable stop member having a first operative position permitting the index arm and the stem to be fully seated to close said auxiliary passage in the rotor, said adjustable stop member having a second operative position limiting the seating of the index arm and the stem to position said auxiliary valve a predetermined distance away from said auxiliary passage in the rotor to permit restricted flow therethrough to said first passage in the valve body, and said adjustable stop member having a third operative position further limiting the seating of the index arm and the stem to position said rinse valve a predetermined greater distance away from said auxiliary passage in the rotor to permit substantially greater flow therethrough to said first passage in the valve body.

8. The combination of claim 7, further characterized by the provision of an inlet chamber in said stator, an inlet valve attached to said stem and positioned to control communication between said inlet chamber and said valve chamber enclosed by the cover, and passages at said inlet valve effecting communication between opposite sides of the attachment of the inlet valve to the stem to balance the fluid pressures thereat on the inlet valve in all positions thereof.

9. In a lift-turn valve for controlling the regeneration of a water treatment tank, the combination of a multiple port stator having a first passage adapted to communicate with the top of the treatment tank and an injector having its outlet adapted to communicate with the top of the treatment tank, a cover above the stator defining therewith a valve chamber, a multiple port rotor in said valve chamber adapted to be seated in confronting relation with said stator and adapted to be lifted, turned and reseated in confronting relation with said stator to selectively control the registration of its ports with the stator ports and thereby to control the flows therethrough, a stem for unseating the rotor projecting beyond the top of the cover, an index member at the top of the cover formed with recesses angularly about the stem, an index arm carried by the stem above the cover and positioned to selectively seat in said recesses in the index member, resilient means urging the rotor to seat in confronting relation with the stator, a lost-motion connection between the stem and the rotor permitting the rotor to seat in confronting relation with the stator while the stem is not yet fully seated, said rotor having an auxiliary valve passage communicating with said first passage in the stator when the rotor and stem have been turned to one angular position said rotor in said angular position being operative to pass water through said injector in the stator, an auxiliary valve member connected to said stem for movement therewith and operatively connected to said rotor to turn the rotor in response to turning of the stem and located above said auxiliary valve passage in the rotor to control the flow therethrough, and a pivoted adjustable stop member mounted on said cover adjacent a recess in said index plate and operative to engage said index arm thereat and limit the seating of the stem when the stem has been turned to position the auxiliary valve passage in the rotor in register with said first passage in the valve body, said adjustable stop member having a first operative position permitting the index arm to seat fully in said recess in the index member and seat said auxiliary valve against said auxiliary valve passage in the rotor while a limited flow of water is passed through the injector in the stator to its outlet, said adjustable stop member having a second operative position limiting the seating of the index arm and of the stem to position said auxiliary valve a predetermined distance above said passage in the rotor for flow therethrough to said first passage in the valve body while a limited flow of water is passed through the injector in the stator to its outlet to provide a limited flow out through said first passage.

10. In a lift-turn valve for base exchange water treatment apparatus having a treatment tank, the combination of a multiple port stator having a top port for communication with the top of the tank, a raw water inlet, and a drain port, a cover for said body forming a valve chamber, a multiple port rotor in said chamber adapted to seat against the stator in a plurality of relative positions having an auxiliary valve port positioned to register with the stator drain port in a service position of the rotor and with the top port in another position thereof, a longitudinally movable stem for unseating, turning and reseating the plate to selectively control registration of the rotor and stator ports, a balanced valve member for controlling flow to the valve chamber through the raw water inlet constantly exposed entirely across its extent remote from said raw water inlet to the pressure in the chamber, an auxiliary valve on the rotor for controlling the flow through the auxiliary valve port, and means acting between the stem and the balanced valve member and between the stem and the auxiliary valve for closing the balanced valve member and opening the auxiliary valve in response to unseating movement of the stem in the service position of the rotor and for opening the balanced valve member and retaining the auxiliary valve in adjusted open position upon partial reseating of the stem in said other position of the rotor and means for retaining the stem in partially reseated position.

11. In a lift-turn valve for base exchange water treatment apparatus having a treatment tank, the combination of a multiple port stator having a top port for communication with the top of the tank, a raw water inlet, and a drain port, a cover for said body forming a valve chamber, a multiple port rotor in said valve chamber spring-pressed to seating position against the stator having an auxiliary valve port adapted to register with the stator drain port in a service position of the rotor and with the top port in another position thereof, a longitudinally movable stem for unseating, turning and reseating the rotor to selectively control registration of the rotor and stator ports, a lost-motion connection between the stem and the rotor for delaying unseating of the rotor during preliminary movement of the stem and for reseating the rotor prior to reseating of the stem, an inlet valve for controlling flow through the raw water inlet, an auxiliary valve for controlling the flow through the auxiliary valve port, said inlet and auxiliary valves being secured to the stem for operation thereby during unseating lost-motion movement to close the inlet and open the auxiliary valve to the stator drain port whereby to relieve the pressure in the chamber prior to unseating the rotor in the service position, and an adustable stop acting on the stem in said other position of the rotor to limit lost-motion movement of the stem subsequent to seating of the rotor to retain the inlet and auxiliary valves in adjusted open position to control flow to the top stator port.

12. In a lift-turn valve for controlling the service and regeneration of a base exchange water treatment apparatus having a treatment tank, the combination of a multiple port stator having a first passage adapted to communicate with the top of the treatment tank, a cover at one side of said stator enclosing a valve chamber, a multiple port rotor in said valve chamber adapted to be unseated, turned and reseated in confronting relation with said stator to selectively control the registration of its ports with the stator ports and thereby to control the flows therethrough, a stem for unseating and turning the rotor, means for resiliently urging the rotor to a position seated in confronting relation with the stator, a lost-motion connection between the stem and the rotor for delaying unseating of the rotor until the stem has been lifted a predetermined amount and permitting the rotor to seat in confronting relation with the stator before the stem is fully seated, said rotor having an auxiliary valve passage which communicates with said first passage in the stator in one angular position of the rotor, an auxiliary valve member connected to said stem to move in unison therewith and located at said auxiliary passage in the rotor to control the flow therethrough, an index arm connected to said stem and operative to be indexed to various angular locations about the valve cover when the stem is turned, and an adjustable stop member mounted on said valve cover to engage said index arm in the angular position of the stem at which said auxiliary passage in the rotor registers with said first passage in the stator, said adjustable stop member having a first operative position permitting the index arm and the stem to be fully seated to close said auxiliary passage in the rotor, said adjustable stop member having a second operative position limiting the seating of the index arm and the stem to position said auxiliary valve a distance away from said auxiliary passage in the rotor to permit a limited flow therethrough to said first passage in the valve body.

13. In a lift-turn valve for controlling the service and regeneration of a base exchange water treatment apparatus having a treatment tank, the combination of a multiple port valve stator, a cover at one side of said stator enclosing a valve chamber, the stator having an inlet port in constant communication with the chamber, and annular ports adapted to communicate with the top of the treatment tank, the bottom of the tank, drain and service, a multiple port rotor in said valve chamber adapted to be unseated, turned and reseated in confronting relation with said stator to selectively control the registration of its ports with the stator ports and thereby to control the flow through the stator, said rotor having an inlet passage communicating with the inlet port of the stator in all positions of the rotor, a port passage which communicates with the top port of the stator and an auxiliary valve passage which communicates with said drain port in the stator in one angular position of the rotor, said inlet ports and the ports and passages of the rotor having greater port areas than the ports of the stator, an auxiliary valve connected to said stem to move in unison therewith and located at said auxiliary valve passage to control the flow therethrough, and a lost-motion connection between the stem and the rotor for delaying unseating of the rotor until the stem and the auxiliary valve have been lifted a predetermined amount to establish flow from the valve chamber through the auxiliary passage to the drain port and for permitting the rotor to seat in confronting relation against the stator before the stem is fully seated and the auxiliary valve closed to progressively throttle the flow to the drain port in the course of continued lost-motion movement of the stem and seating movement of the auxiliary valve.

14. The combination recited in claim 13 including an adjustable restriction at said drain port for limiting the rate of flow therethrough when the auxiliary valve is open, to a point below the flow capacity of the auxiliary valve passage and thereby adjust the pressure drop in the valve chamber when the auxiliary valve is opened.

15. A lift-turn valve comprising a multiport stator member, a cover on the stator enclosing a multiport rotor member, a fluid inlet communicating with the inside of the cover, the stator and rotor having faces arranged in confronting relation, the rotor arranged to be lifted, turned to preselected positions and reseated relative to the stator to enable selected ports of the stator and rotor to be brought into registration for the flow of fluid therethrough, the rotor having bearing means, a slidable stem arranged to move in the bearing means and to lift the rotor, an auxiliary valve port on the rotor, an auxiliary valve member attached to the stem and arranged for opening and closing the auxiliary valve port, means for lifting the auxiliary valve member before the rotor is lifted and including means for seating the rotor before the auxiliary valve member is seated, adjustable means for holding the auxiliary valve member in a lifted position while the rotor is seated at one of the preselected positions of the rotor, and means for lifting, turning, and reseating the auxiliary valve member and rotor.

16. A lift-turn valve comprising a multiport stator member, a cover on the stator enclosing a multiport rotor member, a fluid inlet communicating with the inside of the cover, the stator and rotor having faces arranged in confronting relation, the rotor arranged to be lifted, turned to preselected positions and reseated relative to the stator to enable selected ports of the stator and rotor to be brought into registration for the flow of fluid therethrough, the rotor having bearing means, a slidable stem arranged to move in the bearing means, an auxiliary valve port on the rotor, an auxiliary valve member attached to the stem and arranged for opening and closing the auxiliary port, means for lifting the valve member before the rotor is lifted and including means for seating the rotor before the auxiliary valve member is seated, means for holding the auxiliary valve member in a lifted position while the rotor is held seated at one of the preselected positions of the rotor, adjustable means controlling the rate of fluid flow through the auxiliary port when the auxiliary valve member is held in a lifted position, and means for lifting, turning, and reseating the auxiliary valve member and rotor.

17. A lift-turn valve for water treating equipment comprising a multiport stator member, a cover on the stator enclosing a multiport rotor member, a fluid inlet communicating with the inside of the cover, the stator and rotor having faces arranged in confronting relation, the rotor arranged to be lifted, turned to preselected positions and reseated relative to the stator to enable selected ports of the stator and rotor to be brought into registration for the flow of fluid therethrough, the stator having two drain ports, restriction means for regulating the rate of fluid flow through each of the two drain ports, the rotor having bearing means, a slidable stem shaft arranged to move in the bearing means, an auxiliary valve port on the rotor, an auxiliary valve member attached to the stem and arranged to open and close the auxiliary valve port, means for lifting the auxiliary valve member before the rotor is lifted and including means for seating the rotor before the auxiliary valve member is seated, means for holding the auxiliary valve member in a lifted position while the rotor is held seated at one of the preselected positions of the rotor, the auxiliary valve member arranged when held in said lifted position to give a fluid flow to one of the drain ports and when held lifted, in another rotor position, to give a fluid flow to the other drain port, and means for lifting, turning, and reseating the valve member and rotor.

18. A lift-turn valve for water treating equipment comprising a multiport stator member, a cover on the stator enclosing a multiport rotor member, a fluid inlet communicating with the inside of the cover, the stator and rotor having faces arranged in confronting relation, the rotor arranged to be lifted, turned to preselected positions and reseated relative to the stator to enable selected ports of the stator and rotor to be brought into registration for the flow of fluid therethrough, the stator having a drain port, an adjustable restriction at the drain port, the rotor having bearing means, a slidable stem arranged to move in the bearing means, an auxiliary valve port on the rotor, an auxiliary valve member attached to the stem and arranged to open and close the auxiliary valve port, means for lifting the auxiliary valve member before the rotor is lifted and including means for seating the rotor before the auxiliary valve member is seated, means for holding the auxiliary valve valve member in a lifted position while the rotor is held seated at one of the preselected positions of the rotor, the auxiliary valve member arranged when held in its lifted position to give a fluid flow through the drain port, and means for lifting, turning, and reseating the valve member and rotor.

19. A lift-turn type valve comprising a multiple port stator member, a cover on the stator enclosing a multiport rotor member, the stator and rotor having faces arranged in confronting relation, the rotor arranged to be lifted, turned and reseated in preselected positions relative to the stator to change the fluid flows through the ports in the stator, a fluid inlet communicating with the inside of the cover, an auxiliary valve port on the rotor, an auxiliary valve member arranged to open and close the auxiliary valve port, means for lifting the auxiliary valve member before the rotor is lifted and including means for seating the rotor before the auxiliary valve member is seated, projecting ring-like means on one of the faces around the ports thereof to space apart substantial areas of the confronting faces of the stator and rotor when in seated relation to provide an open counterbalancing pressure space for the establishment of a hydraulic counter pressure in opposition to the seating pressure on the rotor, the auxiliary valve member arranged when lifted prior to the lifting of the rotor to decrease the seating pressure on the rotor and increase the areas subject to the hydraulic counter pressure, and means for lifting, turning and reseating the auxiliary valve member and rotor.

20. A lift-turn type valve comprising a multiple port stator member, a cover on the stator enclosing a multiport rotor member, the stator and rotor having faces arranged in confronting relation, the rotor arranged to be lifted, turned and reseated in preselected positions relative to the stator to change the fluid flows through the ports in the stator, a fluid inlet communicating with the inside of the cover, the fluid pressure tending to hold the rotor seated, an auxiliary valve port on the rotor, an auxiliary valve member arranged to open and close the auxiliary valve port, means for lifting the auxiliary valve member before the rotor is lifted and including means for seating the rotor before the auxiliary valve member is seated, the cover having an index flange arranged with index slots therein, one of said index slots having adjacent thereto stop means for holding the valve member in a lifted position while the rotor is held seated, projecting means on one of the faces around the ports thereof to space apart substantial areas of the confronting faces of the stator and rotor when in seated relation to provide an open counterbalancing pressure space for the establishment of a hydraulic counter pressure in opposition to the seating pressure on the rotor, the auxiliary valve member arranged when lifted prior to the lifting of the rotor to decrease the seating pressure on the rotor and increase the areas subject to the hydraulic counter pressure and means for actuating the auxiliary valve member and rotor.

21. A lift-turn type valve for water treatment equipment comprising a multiport stator member, a cover on the stator enclosing a multiport rotor member having an auxiliary valve port, an auxiliary valve member arranged to seat thereon, a fluid inlet communicating with the inside of the cover, the stator having two drain ports, one of the drain ports arranged with an adjustable restriction that reduces the liquid flow through this drain port, the stator and rotor having faces arranged in confronting relation, the rotor arranged to be lifted, turned and reseated relative to the stator between service and other positions to enable selected ports of the stator and rotor to be brought in to registration for the flow of fluid therethrough, the rotor arranged when seated in the other preselected positions to establish liquid flows to one or the other of the drain ports, means for lifting the auxiliary valve member before the rotor is lifted and including means for seating the rotor before the auxiliary valve member is seated, the rotor arranged when being seated at the service position for the auxiliary valve port to register with the drain port having the restriction so that the water hammer will be reduced and means for lifting, turning and reseating the auxiliary valve member and rotor.

22. A lift-turn type valve for water treating equipment comprising a multiport stator member, a cover on the stator enclosing a combination multiport rotor and auxiliary valve member seated thereon on an auxiliary valve port, the stator and rotor having faces arranged in confronting relation with narrow projecting seat means on one of the faces around the ports thereof for spacing the stator and rotor apart when in seated relation, means for moving the rotor to different preselected positions relative to the stator to give different combinations of ports and liquid flows, a fluid inlet communicating with the inside of the cover, the fluid pressure tending to hold the rotor seated, means for lifting the auxiliary valve member before the rotor is lifted, to reduce the force required to lift the rotor from a seated position, means for seating the rotor before the auxiliary valve member is seated, whereby to prevent the rotor from chattering when being seated, and means for moving the auxiliary valve member and rotor between their various positions.

23. A lift-turn valve for water treating equipment comprising a multiport stator having two drain ports, a cover on the stator enclosing a multiport rotor, a fluid inlet communicating with the inside of the cover, the stator and rotor having faces arranged in confronting relation, the rotor arranged to be lifted, turned to preselected positions and reseated relative to the stator to enable selected ports of the stator and rotor to be brought into registration for the flow of fluid therethrough, an auxiliary valve port on the rotor, an auxiliary valve member arranged to open and close the auxiliary valve port, means for lifting the auxiliary valve member before the rotor is lifted and including means for seating the rotor before the auxiliary valve member is seated, means for holding the auxiliary valve member in a lifted position while the rotor is held seated at one of the preselected positions of the rotor, the preselected positions of the rotor including a backwash position and a regeneration position, an adjustable restriction at one of the drain ports to regulate the fluid flow when the rotor is in the backwash position, and an adjustable restriction at the other drain port to regulate the fluid flow for a fast rinse flow when the auxiliary valve member is held in its lifted position, and means for lifting, turning and reseating the auxiliary valve member and rotor.

24. A lift-turn valve for water treating equipment comprising: a multiported stator member having an injector therein, a cover on the stator enclosing a multiport rotor member, a fluid inlet communicating with the inside of the cover, the stator and rotor having faces arranged in confronting relation, the rotor arranged to be lifted, turned to preselected positions and reseated relative to the stator to enable selected ports of the stator and rotor to be brought into registration for the flow of fluid therethrough, an auxiliary valve port on the rotor, an auxiliary valve member arranged to open and close the auxiliary valve port, means for lifting the auxiliary valve member before the rotor is lifted and including means for seating the rotor before the auxiliary valve member is seated, means for holding the auxiliary valve member in a lifted position while the rotor is held seated at one of the preselected positions and thereby provide various fluid flows at said one preselected position including a first flow through the injector and a second fast rinse flow when the auxiliary valve member is held in its lifted position and means for actuating the auxiliary valve member and rotor in lifting, turning and reseating.

References Cited in the file of this patent

UNITED STATES PATENTS

| | | |
|---|---|---|
| 1,208,590 | Lilly | Dec. 12, 1916 |
| 1,534,691 | Darby | Apr. 21, 1925 |
| 2,093,692 | Daniels | Sept. 21, 1937 |
| 2,202,960 | Parker | June 4, 1940 |
| 2,209,989 | McCanna | Aug. 6, 1940 |
| 2,391,126 | Carter | Dec. 18, 1945 |
| 2,428,410 | Daniels | Oct. 7, 1947 |